Feb. 5, 1946.  A. O. L. WENNERBY  2,394,128
GATE VALVE
Filed Sept. 7, 1943  2 Sheets-Sheet 1

Inventor
Arthur Oskar Leonard Wennerby
By  E. F. Wendroth
Attorney

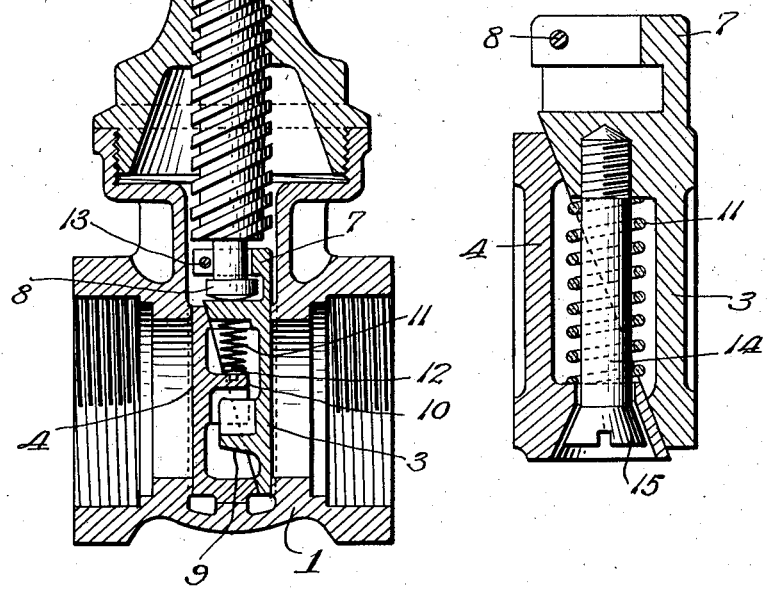

Patented Feb. 5, 1946

2,394,128

UNITED STATES PATENT OFFICE 2,394,128

GATE VALVE

Arthur Oskar Leonard Wennerby,
Stockholm, Sweden

Application September 7, 1943, Serial No. 501,479
In Sweden August 25, 1942

2 Claims. (Cl. 251—69)

This invention relates to gate valves in which the gates have parallel valve faces.

In most known gate valves in which the gates have parallel valve faces, the passage of the valve is sealed by pressing the valve faces against their seats, usually by means of a device operating in the centre of the gates; e. g. a wedge, an eccentric or the like. Valves provided with such a device close both the inlet and the outlet. In another known type of gate valves with parallel valve faces, the one valve face is pressed against its seat by means of fluid pressure. Valves of this type seal only the outlet, for which reason the valve casing is continuously under the pressure of the fluid.

The first mentioned type of valve seals only against a relatively low pressure for which reason its use is but limited, whilst the latter type seals best against high pressure. It has long been desired to produce a type of valve that will seal effectively against high as well as against low pressures.

The present invention contemplates an improved gate valve of the first-mentioned type that may be used for all purposes and which will effectively seal against any pressure. This is achieved in accordance with the invention mainly by dividing the gate diagonally. When the valve is closed, the inclined planes are brought into contact with one another, whereby an even sealing pressure is obtained by wedge action.

The invention is illustrated in the accompanying drawings, in which

Fig. 4 is an axial section of a modified embodiment of the valve and

Fig. 5 is a longitudinal section through another modification.

Figure 1:
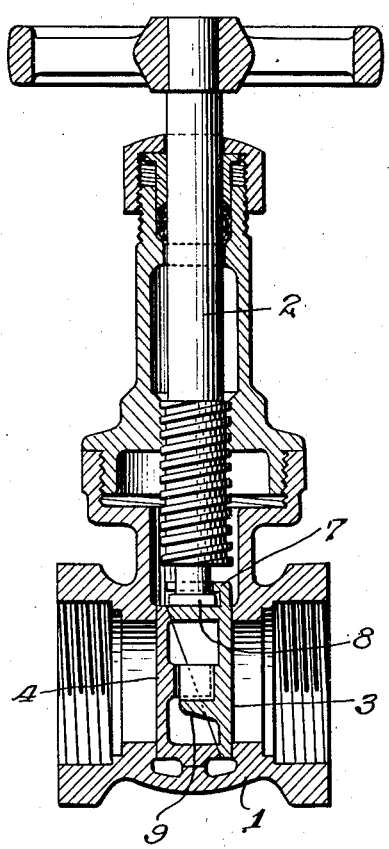
Fig. 1 is an axial section through the valve.
Figure 2:
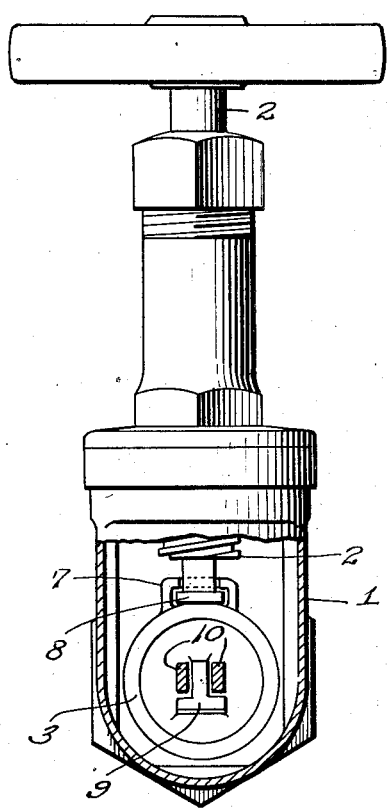
Fig. 2 is a side view, partly in section.
Figure 3:
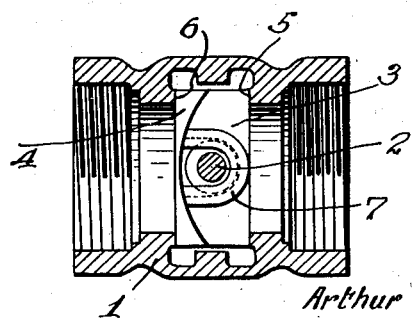
Fig. 3 is a cross section taken at right angles to the section in Fig. 1.

In the drawings, 1 designates the valve casing, in which the divided gate is slidable and operable by means of a threaded spindle 2 provided with a hand-wheel. The gate consists of two parts 3 and 4 having parallel surfaces forming valve faces for cooperation with the likewise parallel valve seats 5 and 6 in the valve casing. As shown in Fig. 1, the gate is divided diagonally, the one half 3 of the gate being provided at its upper end with a device for connecting it to the spindle 2. This device, as shown in the drawings, consists of a projection 7 provided with a recess in which a stud 8 or the like at the end of the spindle 2 engages in such a way that it may rotate therein.

The other half 4 of the gate is loosely connected to the half 3 by means of a projection 9 of inverted T-shape provided on the half 3 approximately in the middle of the surface facing the half 4, and a projection 10 provided on the half 4 and forming a fork or the like which grips the stem of the T-shaped projection 9. It will be appreciated that when the spindle 2 is actuated for opening the valve, the half 4 of the gate will accompany the half 3 of the gate on its upward movement on account of the above mentioned connection, and when the spindle is actuated for closing the valve, both halves are moved in a downward direction, after which, when the half 4 has reached its bottom position, a continued actuation of the valve spindle 2 will cause the halves of the gates to be pressed apart by wedge action on account of the inclination of their contacting surfaces.

The device according to Fig. 4 coincides generally with that shown in Fig. 1, the only essential difference being that a coil spring 11 is inserted between the two halves 3 and 4 in such a way that it is supported at one end by a plane surface cut out in the cylindrical interior surface of the half 3 and at the other end by the projection 10 on the half 4 cooperating with the T-like projection 9 on the half 3. In this case the projection 10 is preferably of U-shape and provided with a stud 12 for holding the spring 11 in position.

When the hand-wheel is turned for opening the valve, the spring 11 will immediately bring about a relative movement of the halves 3 and 4, so that the sealing surfaces or valve faces of the gate are automatically spaced from the cooperating sealing surfaces or valve seats of the valve case. For this purpose, as shown in the drawings, a small amount of vertical play is provided between the guide members 9 and 10.

The spring 11 also provides for the holding together of the halves in a single unit, which facilitates the mounting thereof. For the same purpose it is preferable to provide a pin 13 across the recess for the spindle 2 in the projection 7, whereby an undesired detachment of the gate from the spindle during the mounting process is prevented.

Fig. 5 shows a modification of the invention in which into the half 3 is threaded a screw 14 inserted through a bore into the other half 4 of the gate, an enlargement of the bore being provided for receiving the counter-sunk head 15. The screw is surrounded by the spring 11. The operation of this modification is similar to that of the preceding embodiment.

The devices shown in the drawings are to be considered only as illustrative examples in which various details may be modified in various ways within the scope of the invention.

What I claim and desire to secure by Letters Patent is:

1. A valve having a fluid passage, parallel valve seats and a movable valve gate having parallel operative faces and divided diagonally into two relatively movable wedge-shaped parts, a valve spindle, one of said wedge-shaped parts being provided with a bifurcated projection having the prongs thereof in embracing relationship with regard to said valve spindle, said projection having a portion spaced from its associated wedge-shaped part to define a recess therebetween, said valve spindle being provided with a terminal stud having an enlarged head lodged in said recess, whereby movement of said spindle entrains said associated wedge-shaped part while enabling the latter to move a short distance in relation to said spindle in a transverse direction relative to the spindle axis, and means interconnecting said two wedge-shaped parts for simultaneous movement at the end of a limited relative movement, said means including a compression spring housed within and extending between said two wedge-shaped parts whereby the spring pressure tends to move said parts relatively to each other in a direction for decreasing the perpendicular distance between said parallel operative faces.

2. A valve having a fluid passage, parallel valve seats and a movable valve gate having parallel operative faces and divided diagonally into two relatively movable wedge-shaped parts, a valve spindle, one of said wedge-shaped parts being provided with a bifurcated projection having the prongs thereof in embracing relationship with regard to said valve spindle, said projection having a portion spaced from its associated wedge-shaped part to define a recess therebetween, said valve spindle being provided with a terminal stud having an enlarged head lodged in said recess, whereby movement of said spindle entrains said associated wedge-shaped part while enabling the latter to move a short distance in relation to said spindle in a transverse direction relative to the spindle axis, and means interconnecting said two wedge-shaped parts for simultaneous movement at the end of a limited relative movement, said means including a headed screw extending longitudinally between said wedge-shaped parts and threaded into the part connected to said spindle, the other part being provided with an enlarged bore for the reception of the head of said screw, and a compression spring surrounding said screw and extending between said wedge-shaped parts.

ARTHUR OSKAR LEONARD WENNERBY.